US012072718B2

United States Patent
Oh et al.

(10) Patent No.: US 12,072,718 B2
(45) Date of Patent: Aug. 27, 2024

(54) ELECTRONIC APPARATUS AND CONTROLLING METHOD USING CORRECTED SENSOR VALUES

(71) Applicant: Samsung Electronics Co., Ltd., Suwon-si (KR)

(72) Inventors: Jeongil Oh, Suwon-si (KR); Suho Jo, Suwon-si (KR); Jonghun Ha, Suwon-si (KR); Jaeyeon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 16/994,489

(22) Filed: Aug. 14, 2020

(65) Prior Publication Data
US 2021/0048834 A1 Feb. 18, 2021

(30) Foreign Application Priority Data
Aug. 14, 2019 (KR) .................. 10-2019-0099447

(51) Int. Cl.
*G05D 7/06* (2006.01)
*F24C 7/08* (2006.01)
(Continued)

(52) U.S. Cl.
CPC .......... *G05D 7/0635* (2013.01); *F24C 7/087* (2013.01); *F24F 11/63* (2018.01); *G01F 1/6965* (2013.01); *G01F 25/15* (2022.01)

(58) Field of Classification Search
CPC ........ F24F 11/30; F24F 11/64; F24F 2110/10; F24F 11/38; F24F 11/32; F24F 11/63;
(Continued)

(56) References Cited

U.S. PATENT DOCUMENTS 4,337,516 A * 6/1982 Murphy ................ G01D 18/00
702/183
5,661,735 A * 8/1997 Fischer .................... G01D 3/08
702/155
(Continued)

FOREIGN PATENT DOCUMENTS

CN 101344783 A 1/2009
CN 102866430 A 1/2013
(Continued)

OTHER PUBLICATIONS

International Search Report and Written Opinion of the International Searching Authority in connection with International Application No. PCT/KR2020/010698 dated Nov. 11, 2020, 18 pages.
(Continued)

*Primary Examiner* — Darrin D Dunn

(57) ABSTRACT

A method of controlling an electronic apparatus is provided. The method includes the steps of receiving measurement values for the state of air displayed on a plurality of external electronic apparatuses from each of the plurality of external apparatuses, calculating rates of change of the measurement values for each of the plurality of external electronic apparatuses based on the received measurement values, identifying external electronic apparatuses of which differences of the calculated rates of change belong to a predetermined range among the plurality of external electronic apparatuses, correcting the measurement values received from at least one external electronic apparatus among the identified external electronic apparatuses such that the measurement values received from the identified external electronic apparatuses become the same as one another, and transmitting information related to the corrected measurement values to the at least one external electronic apparatus.

12 Claims, 10 Drawing Sheets

(51) Int. Cl.
  *F24F 11/63* (2018.01)
  *G01F 1/696* (2006.01)
  *G01F 25/10* (2022.01)

(58) Field of Classification Search
  CPC ........ F24F 11/58; F24F 11/52; F24F 2110/50; G05B 15/02; G05B 2219/2614; G05B 19/042; G05B 23/0221; G05B 2219/33331; G05B 19/0428; G01R 31/2829; G01R 19/0038; G05D 23/1917; G05D 23/1932; G05D 1/0055; G05D 7/0635; G06F 11/0793; G06F 11/3058; G06F 11/3089; G06F 11/3452; G06F 11/3476; F24C 7/087; G01F 1/6965; G01F 25/15; G01D 21/02; G01N 15/02; G06Q 50/26
  See application file for complete search history.

(56) References Cited

U.S. PATENT DOCUMENTS

| | | | |
|---|---|---|---|
| 5,743,104 A | 4/1998 | Kim et al. | |
| 6,059,947 A | 5/2000 | Kato et al. | |
| 6,356,857 B1* | 3/2002 | Qin | H04L 12/1895 702/185 |
| 6,463,347 B1* | 10/2002 | Nevruz | F22B 35/18 700/67 |
| 6,924,727 B2 | 8/2005 | Nagaoka | H04L 12/2805 700/83 |
| 7,004,191 B2 | 2/2006 | Shajii et al. | |
| 7,376,499 B2* | 5/2008 | Salman | G01R 31/2846 701/31.2 |
| 7,389,158 B2* | 6/2008 | Desrochers | G01N 1/26 700/277 |
| 7,539,593 B2 | 5/2009 | Machacek | |
| 8,147,302 B2* | 4/2012 | Desrochers | F24F 11/63 702/50 |
| 9,012,814 B2 | 4/2015 | Park et al. | |
| 9,071,282 B1* | 6/2015 | Want | H04B 5/02 |
| 9,074,917 B2* | 7/2015 | Secor | G01F 1/46 |
| 9,103,557 B2* | 8/2015 | Choi | G05D 23/1932 |
| 9,881,478 B1* | 1/2018 | Scaringe | G08B 21/187 |
| 10,866,005 B2 | 12/2020 | Jung et al. | |
| 10,935,270 B2 | 3/2021 | Kim et al. | |
| 11,141,688 B2 | 10/2021 | Hur et al. | |
| 11,274,607 B2* | 3/2022 | Panov | G05B 23/0254 |
| 11,327,476 B2* | 5/2022 | Chakraborty | G01R 31/2829 |
| 2003/0158694 A1* | 8/2003 | Wegerich | G01D 3/08 702/127 |
| 2006/0086103 A1* | 4/2006 | Lee | F25B 49/005 62/126 |
| 2008/0270162 A1 | 10/2008 | Machacek | |
| 2009/0182490 A1* | 7/2009 | Saunders | F02D 41/2458 701/114 |
| 2009/0223234 A1* | 9/2009 | Campbell | F24F 11/0001 62/127 |
| 2010/0332173 A1* | 12/2010 | Watson | A61B 5/02255 702/85 |
| 2011/0154834 A1* | 6/2011 | Choi | F25B 49/005 62/56 |
| 2012/0323376 A1* | 12/2012 | Honda | F24F 11/62 700/276 |
| 2013/0087628 A1* | 4/2013 | Nelson | F24F 11/30 236/51 |
| 2013/0261805 A1* | 10/2013 | Kuroiwa | F24F 11/56 236/51 |
| 2013/0327018 A1* | 12/2013 | Tylutki | F02D 41/222 60/277 |
| 2014/0005838 A1* | 1/2014 | Ogura | F24F 11/72 700/276 |
| 2014/0058705 A1* | 2/2014 | Brill | G01N 35/00 702/183 |
| 2014/0081467 A1* | 3/2014 | Sato | F24F 11/30 700/276 |
| 2015/0022351 A1 | 1/2015 | Gettings et al. | |
| 2015/0051739 A1* | 2/2015 | Song | G05B 15/02 700/276 |
| 2015/0128618 A1* | 5/2015 | Park | F24F 11/58 62/126 |
| 2016/0025369 A1* | 1/2016 | Lim | F24F 11/30 236/1 C |
| 2016/0183857 A1* | 6/2016 | Harper | G01N 33/66 702/85 |
| 2016/0187021 A1* | 6/2016 | Harayama | F24D 19/1084 236/1 C |
| 2016/0217674 A1* | 7/2016 | Stewart | F24F 11/30 |
| 2016/0353184 A1* | 12/2016 | Sindia | H04W 52/28 |
| 2018/0038609 A1* | 2/2018 | Kuroiwa | F24F 11/49 |
| 2018/0095963 A1 | 4/2018 | Verma et al. | |
| 2018/0119983 A1* | 5/2018 | Tezuka | F24F 1/027 |
| 2018/0202681 A1* | 7/2018 | Kim | F24F 11/30 |
| 2018/0224148 A1* | 8/2018 | Jung | F24F 11/52 |
| 2018/0276860 A1* | 9/2018 | Voigt | G01D 7/005 |
| 2018/0283722 A1* | 10/2018 | Jung | G05B 15/02 |
| 2019/0024926 A1 | 1/2019 | Kim et al. | |
| 2019/0074990 A1* | 3/2019 | Reimer | G08B 29/185 |
| 2019/0120517 A1* | 4/2019 | Gyota | F24F 11/58 |
| 2019/0178517 A1* | 6/2019 | Lau | G05B 19/0426 |
| 2019/0196426 A1 | 6/2019 | Cha et al. | |
| 2019/0232210 A1 | 8/2019 | Hur et al. | |
| 2019/0286173 A1* | 9/2019 | Pickle | F24F 11/745 |
| 2019/0324434 A1* | 10/2019 | Cella | G06T 11/206 |
| 2019/0324442 A1* | 10/2019 | Cella | G06N 3/006 |
| 2019/0353374 A1* | 11/2019 | Song | G05B 19/0428 |
| 2019/0368762 A1 | 12/2019 | Kim et al. | |
| 2019/0390867 A1 | 12/2019 | Lee | |
| 2020/0014864 A1 | 1/2020 | Kang | |
| 2020/0018505 A1* | 1/2020 | Wan | F24F 11/38 |
| 2020/0080742 A1* | 3/2020 | Okamoto | F24F 1/32 |
| 2020/0103387 A1* | 4/2020 | Brown | G01N 33/0073 |
| 2020/0207362 A1* | 7/2020 | Nishida | B60W 50/032 |
| 2020/0225655 A1* | 7/2020 | Cella | G05B 23/024 |
| 2020/0285226 A1* | 9/2020 | Chatterjee | G05B 23/0275 |
| 2020/0327009 A1* | 10/2020 | Callison | H04Q 9/04 |
| 2020/0340703 A1* | 10/2020 | Kimura | F24F 11/79 |
| 2021/0048209 A1* | 2/2021 | Xiong | F24F 11/30 |
| 2021/0180824 A1* | 6/2021 | Castillo | H04L 12/283 |
| 2021/0199334 A1* | 7/2021 | Tan | F24F 11/54 |
| 2021/0318013 A1* | 10/2021 | Rigg | F24F 11/74 |
| 2021/0359516 A1* | 11/2021 | Hatamosa | H02J 3/144 |
| 2021/0398662 A1* | 12/2021 | Strom | G16H 40/40 |
| 2022/0034543 A1* | 2/2022 | Alanqar | G05B 13/044 |
| 2022/0099325 A1* | 3/2022 | Okamoto | F24F 11/64 |

FOREIGN PATENT DOCUMENTS

| | | |
|---|---|---|
| CN | 106251013 A | 12/2016 |
| CN | 108240694 A | 7/2018 |
| CN | 108474577 A | 8/2018 |
| CN | 110081923 A | 8/2019 |
| EP | 2 351 972 A1 | 8/2011 |
| EP | 3 358 267 A1 | 8/2018 |
| EP | 3475664 A1 | 5/2019 |
| JP | H11-37972 A | 2/1999 |
| JP | 2011-094982 A | 5/2011 |
| KR | 10-2016-0085639 A | 7/2016 |
| KR | 10-2016-0124610 A | 10/2016 |
| KR | 10-2018-0074903 A | 7/2018 |
| KR | 10-2018-0090566 A | 8/2018 |
| KR | 10-1912624 B1 | 10/2018 |
| KR | 10-1916190 B1 | 11/2018 |
| KR | 10-2019-0076513 A | 7/2019 |
| KR | 10-2019-0087347 A | 7/2019 |
| KR | 10-2019-0092902 A | 8/2019 |
| KR | 10-2040505 B1 | 11/2019 |
| KR | 10-2021-0004037 A | 1/2021 |
| WO | 2018117344 A1 | 6/2018 |

OTHER PUBLICATIONS

(56) References Cited

OTHER PUBLICATIONS

Supplementary European Search Report dated Jul. 4, 2022 in connection with European Patent Application No. 20 85 1603, 8 pages.
First Office Action dated Sep. 29, 2023, in connection with Chinese Application No. 202080045147.6, 14 pages.
Request for the Submission of an Opinion dated Nov. 6, 2023, in connection with Korean Application No. 10-2019-0099447, 13 pages.

* cited by examiner

ELECTRONIC APPARATUS AND CONTROLLING METHOD USING CORRECTED SENSOR VALUES

CROSS-REFERENCE TO RELATED APPLICATION

This application is based on and claims priority under 35 U.S.C. § 119(a) of a Korean Patent Application No. 10-2019-0099447 filed on Aug. 14, 2019 in the Korean Intellectual Property Office, the disclosure of which is incorporated by reference herein in its entirety.

BACKGROUND

The disclosure relates to an electronic apparatus and a controlling method of the electronic apparatus, and more particularly, to an electronic apparatus correcting measurement values for the state of air displayed by external electronic apparatuses existing in the same space, and a controlling method of the electronic apparatus.

Recently, due to the influence of industrialization and urbanization, fine dust increased, and climate changed, and accordingly, interest in the state of indoor air (or air quality) is increasing more and more. Temperature, humidity, concentration of fine dust, etc. are major factors determining the state of indoor air. Accordingly, various types of electronic apparatuses that can control or measure the state of air such as an air conditioner, an air purifier, a dehumidifier, an air quality measuring apparatus, etc. are being developed and distributed.

Here, a plurality of electronic apparatuses related to the state of air arranged in the same space may display different values regarding the same kind of state of air, which leads to a problem. For example, as illustrated in FIG. 1, even if an air quality measuring apparatus 10 with display 11, a stand type air conditioner 20 with display 12, and an air purifier 30 with display 13 are arranged in the same space 1 and display the concentration of fine dust, due to the error of the fine dust concentration sensor included in each apparatus, the displays 11, 12, 13 of the apparatuses 10, 20, 30 display different measurement values such as 16, 22.5, and 12. However, display of different fine dust concentration values by apparatuses arranged in the same space 1 as above brings confusion to a user.

Meanwhile, even in the same space, depending on cases, there may be a case wherein it is appropriate that apparatuses display different measurement values. For example, the indoor temperature measured by an air conditioner arranged beside the window of the main room and the temperature measured by an air purifier arranged in the center of the main room may be different from each other, even if an error between sensors is excluded.

Accordingly, there is a rising need for a technology that can appropriately correct measurement values of electronic apparatuses related to the state of air in consideration of various circumstances.

SUMMARY

A method of controlling an electronic apparatus according to an embodiment of the disclosure for achieving the aforementioned purpose includes the steps of receiving measurement values for the state of air displayed on a plurality of external electronic apparatuses from each external apparatus, calculating the rates of change of the measurement values for each of the plurality of external electronic apparatuses based on the received measurement values, identifying external electronic apparatuses of which differences of the calculated rates of change belong to a predetermined range among the plurality of external electronic apparatuses, and correcting the measurement values received from at least one external electronic apparatus among the identified external electronic apparatuses such that the measurement values received from the identified external electronic apparatuses become the same as one another, and transmitting information related to the corrected measurement values to the at least one external electronic apparatus.

Meanwhile, an electronic apparatus according to an embodiment of the disclosure includes a communicator and a processor configured to receive measurement values for the state of air displayed on a plurality of external electronic apparatuses from each external apparatus through the communicator, calculate the rates of change of the measurement values for each of the plurality of external electronic apparatuses based on the received measurement values, identify external electronic apparatuses of which differences of the calculated rates of change belong to a predetermined range among the plurality of external electronic apparatuses, correct the measurement values received from at least one external electronic apparatus among the identified external electronic apparatuses such that the measurement values received from the identified external electronic apparatuses become the same as one another, and control the communicator to transmit information related to the corrected measurement values to the at least one external electronic apparatus.

Meanwhile, in a non-transitory computer-readable recording medium including a program for executing a controlling method of an electronic apparatus according to an embodiment of the disclosure, the controlling method includes the steps of receiving measurement values for the state of air displayed on a plurality of external electronic apparatuses from each external apparatus, calculating the rates of change of the measurement values for each of the plurality of external electronic apparatuses based on the received measurement values, identifying external electronic apparatuses of which differences of the calculated rates of change belong to a predetermined range among the plurality of external electronic apparatuses, and correcting the measurement values received from at least one external electronic apparatus among the identified external electronic apparatuses such that the measurement values received from the identified external electronic apparatuses become the same as one another, and transmitting information related to the corrected measurement values to the at least one external electronic apparatus.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by on e or more computer programs, each of which is formed from computer readable program code an d embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
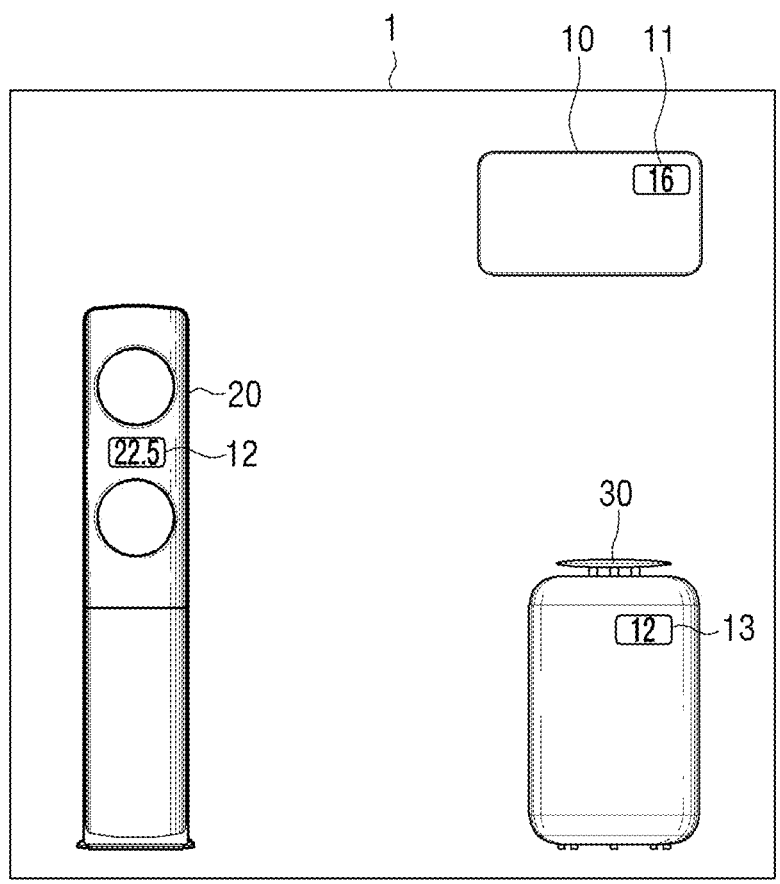
FIG. 1 is a diagram for illustrating the conventional problem.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The purpose of the disclosure is in providing an electronic apparatus that corrects the difference in measurement values for the same kind of state of air (or air quality) measured by electronic apparatuses existing in the same space in consideration of various circumstances, and a controlling method of the electronic apparatus.

In describing the disclosure, in case it is determined that detailed explanation of related known technologies may unnecessarily confuse the gist of the disclosure, the detailed explanation will be omitted. Also, overlapping explanation of the same components will be omitted as far as possible.

Meanwhile, the suffix "part" for components used in the following description is provided or interchangeably used in consideration of only easiness of drafting the specification, and does not have meaning or a function of itself distinguishing it from other components.

Terms used in the disclosure are only used to explain the embodiments, and are not intended to restrict and/or limit the disclosure. Also, singular expressions include plural expressions, unless defined obviously differently in the context.

In addition, in the disclosure, terms such as 'include' or 'have' should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Also, the expressions "first," "second" and the like used in the disclosure may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Also, the terms used in the embodiments of the disclosure may be interpreted as meanings generally known to those of ordinary skill in the art described in the disclosure, unless defined differently in the disclosure.

Hereinafter, various embodiments of the disclosure will be described in detail with reference to the accompanying drawings.

Figure 2:
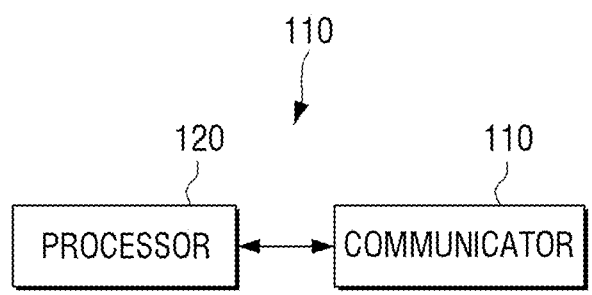
FIG. 2 illustrates a block diagram of an electronic apparatus according to an embodiment of the disclosure.

FIG. 2 illustrates a block diagram of an electronic apparatus 100 according to an embodiment of the disclosure. The electronic apparatus 100 may correct measurement values displayed on external electronic apparatuses 10, 20, 30 in an environment as in FIG. 1. According to FIG. 2, the electronic apparatus 100 includes a communicator 110 and a processor 120.

The communicator 110 is a component for performing communication with external electronic apparatuses. For this, the communicator 110 may include at least one communication module of a near field wireless communication module and a wireless LAN communication module. A near field wireless communication module is a communication module performing data communication with an external device located in a near distance wirelessly, and it may be, for example, a Bluetooth module, a Zigbee module, a Z-wave module, a near field communication (NFC) module, an infrared communication module, etc. Meanwhile, a wireless LAN communication module is a module that is connected to an external network according to a wireless communication protocol such as WiFi and IEEE, etc., and performs communication with an external server or an external device.

In addition to the above, the communicator 110 may further include a mobile communication module that performs communication by connecting to a mobile communication network according to various mobile communication standards such as 3rd Generation (3G), 3rd Generation Partnership Project (3GPP), Long Term Evolution (LTE), and the like. Also, the communicator 110 may further include a wired communication module according to communication standards such as High-Definition Multimedia Interface (HDMI), Universal Serial Bus (USB), Institute of Electrical and Electronics Engineers (IEEE) 1394, RS-232, RS-422, RS-485, Ethernet, and the like.

The processor 120 controls the overall operations of the electronic apparatus 100. In particular, the processor 120 may control the electronic apparatus 100 and thereby perform the operations of electronic apparatuses 100-1 to 100-3 according to the various embodiments that will be described below.

For this, the processor 120 may operate an operating system or an application program and control hardware or software components connected to the processor 120, and may perform various kinds of data processing and operations. Also, the processor 120 may load instructions or data received from at least one of other components on a volatile memory and process them, and store various data in a non-volatile memory.

The processor 120 may be implemented as a dedicated processor (e.g., an embedded processor) for performing operations, or a generic-purpose processor (e.g.: a CPU or an application processor) that can perform operations by executing one or more software programs stored in a memory device.

Meanwhile, in the various embodiments of the disclosure, the electronic apparatus 100 may be implemented as various apparatuses. For example, the electronic apparatus 100 may be implemented as a server 100-1 as in FIG. 3. Also, the electronic apparatus 100 may be implemented as various kinds of electronic apparatuses such as a stand type air conditioner, a wall mounted type air conditioner, an air quality measuring apparatus, an air purifier, etc. including components that can directly control or measure the state of air and a sensor as in FIG. 4A. In addition, the electronic apparatus 100 may be implemented as a mobile device irrelevant to direct control of the state of air as in FIG. 4B.

Hereinafter, an example wherein the electronic apparatus 100 is implemented as a server 100-1 will be explained through FIG. 2 and FIG. 3, and then the remaining embodiments will be explained.

Figure 3:
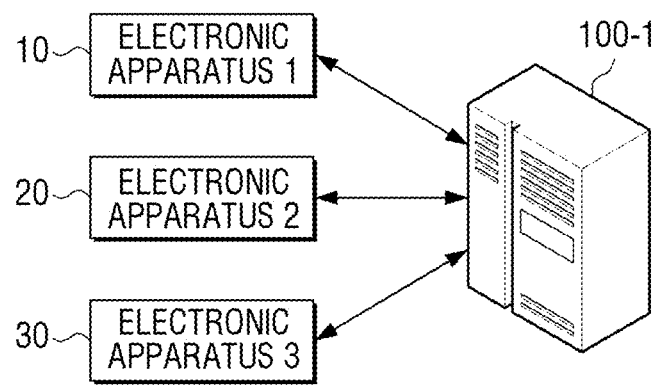
FIG. 3 is a diagram illustrating an example wherein the electronic apparatus in FIG. 2 is implemented as a server according to an embodiment of the disclosure.

FIG. 3 illustrates a state wherein the electronic apparatus 100 implemented as a server 100-1 is connected with a plurality of external electronic apparatuses 10, 20, 30.

The plurality of external electronic apparatuses 10, 20, 30 are apparatuses that can directly control or measure the state of air, and they respectively include various kinds of sensors for measuring the state of air, and may display measurement values for the state of air measured through each sensor. Here, the state of air displayed on the plurality of external electronic apparatuses 10, 20, 30 may be any one of the temperature, humidity, or concentration of dust, but is not limited thereto. Meanwhile, the plurality of external electronic apparatuses 10, 20, 30 may transmit information including measurement values for the state of air displayed on each apparatus to the server 100-1.

For example, the electronic apparatus 1 (10) may be an air quality measuring apparatus, the electronic apparatus 2 (20) may be a stand type air conditioner 20, and the electronic apparatus 3 (30) may be an air purifier 30, and each apparatus 10, 20, 30 may display measurement values for the concentration of fine dust measured through a dust concentration sensor on each apparatus 10, 20, 30, and transmit the displayed measurement values to the server 100-1. However, the embodiments of the disclosure are obviously not limited thereto.

Here, in the information transmitted to the server 100-1, information on the displayed measurement values and the items of the measurement values may be included, but the information is not limited thereto. Also, the measurement values displayed on each electronic apparatus 10, 20, 30 may be transmitted from each electronic apparatus 10, 20, 30 to the server 100-1 by a predetermined cycle, but are not limited thereto.

Accordingly, the processor 120 of the server 100-1 may receive the measurement values for the state of air displayed on the plurality of external electronic apparatuses 10, 20, 30 from each external electronic apparatus 10, 20, 30 through the communicator 110, and calculate the rates of change of the measurement values for each of the plurality of external electronic apparatuses 10, 20, 30 based on the received measurement values.

Specifically, when information including the measurement values is received from the plurality of external electronic apparatuses 10, 20, 30, the processor 120 may determine whether the received measurement values are measurement values for the same kind of state of air. Here, regarding measurement values received simultaneously or during a time period within a specific range, the processor 120 may determine whether the measurement values are measurement values for the same kind of state of air.

If it is determined that the measurement values are measurement values for the same kind of state of air, the processor 120 may compare the measurement values of each external electronic apparatus 10, 20, 30 with one another. If, as a result of comparison, the difference of the measurement values of each external electronic apparatus 10, 20, 30 is outside a predetermined range (e.g., if the measurement values are not the same), the processor 120 may calculate the rates of change of the measurement values based on the plurality of measurement values for each external electronic apparatus 10, 20, 30 received by a predetermined cycle.

Here, the processor 120 may calculate the rates of change based on the plurality of measurement values received from each of the plurality of external electronic apparatuses 10, 20, 30 while external electronic apparatuses that can control the state of air related to the received measurement values among the plurality of external electronic apparatuses 10, 20, 30 operate.

In the aforementioned embodiment, in case the external electronic apparatuses 1, 2, 3 (10, 20, 30) measured the temperature and display the measurement values, the processor 120 may receive each of the plurality of temperature measurement values from the electronic apparatuses 1, 2, 3 (10, 20, 30) during a specific time period when the electronic apparatus 2 (20) that can control the temperature, i.e., the stand type air conditioner operates, and accordingly, the processor 120 may calculate the rates of change of the temperatures of each electronic apparatus 10, 20, 30. Here, the rates of change may be the rates of change of the measurement values per time, but are not limited thereto.

Meanwhile, in case the difference of the measurement values received from the plurality of external electronic apparatuses 10, 20, 30 is within a predetermined range, the processor 120 may not calculate the rates of change. For example, in case all of the external electronic apparatuses 1, 2, 3 (10, 20, 30) display the same temperature measurement value, the processor 120 may determine that the measurement value displayed on each apparatus is correct even if measurement values are received, and may not calculate the rates of change of the measurement values.

Meanwhile, when the rates of change of the measurement values are calculated, as described above, the processor 120 may identify external electronic apparatuses of which differences of the calculated rates of change belong to a predetermined range among the plurality of external electronic apparatuses 10, 20, 30, and correct the measurement values received from at least one external electronic apparatus among the identified external electronic apparatuses such that the measurement values received from the identified external electronic apparatuses become identical to one another.

For example, when the measurement values are transmitted to the server 100-1 while the external electronic apparatuses 1, 2, 3 (10, 20, 30) respectively display temperature measurement values of 24 degrees, 22 degrees, and 22 degrees, the processor 120 may compare the difference of each received measurement value. Here, for example, in case a predetermine range for the difference of the received measurement values is set as a range of one degrees, the difference of each measurement value is outside the predetermined range, and thus the processor 120 may calculate the rates of change of the temperatures based on the measurement values received from the external electronic apparatuses 1, 2, 3 (10, 20, 30) during a specific time period when the electronic apparatus 2 (20) which is a stand type air conditioner operates.

Meanwhile, for example, in case a predetermined range for the difference of the rates of change is set as a range of two degrees, if the temperature measurement values displayed on the external electronic apparatuses 1, 2, 3 (10, 20, 30) became 20 degrees, 18 degrees, and 18 degrees after a specific time period passed after the stand type air conditioner operated, the temperatures were all reduced by −4 degrees, and thus the difference of the rates of change of the temperatures among the external electronic apparatuses 1, 2, 3 (10, 20, 30) becomes 0.

In this case, the processor 120 may identify the external electronic apparatuses 1, 2, 3 (10, 20, 30) as external electronic apparatuses of which differences of the rates of change belong to a predetermined range, and correct the measurement values such that all of the measurement values received from the external electronic apparatuses 1, 2, 3 (10, 20, 30) become identical.

For example, the processor 120 may correct each measurement value based on the minimum value among the measurement values received from the plurality of external electronic apparatuses 10, 20, 30. In the above example, the temperature measurement values currently displayed on the external electronic apparatuses 1, 2, 3 (10, 20, 30) are 20 degrees, 18 degrees, and 18 degrees, and thus the processor 120 may correct the measurement value of the external electronic apparatus 1 (10) as 18 degrees which is the minimum value among the measurement values.

However, the embodiments of the disclosure are not limited thereto, and the processor 120 may correct a measurement value based on any one of the average value, the maximum value, or the median value of the plurality of measurement values received from the plurality of external electronic apparatuses 10, 20, 30.

Accordingly, the processor 120 may control the communicator 110 to transmit information related to the corrected measurement values to the external electronic apparatus 1 (10). Here, information related to the corrected measurement values may be any one of correction values which are corrected from the measurement value or a correction formula for correcting the measurement value. In the above example, the processor 120 may transmit "18 degrees" which is the corrected value to the electronic apparatus 1 (10), or transmit a correction formula which is "−2 degrees" for correcting 20 degrees which is the measurement value to the electronic apparatus 1 (10).

Accordingly, "20 degrees" which is the measurement value displayed on the external electronic apparatus 1 (10) may be corrected to "18 degrees" based on the information related to the corrected measurement values received from the server 100-1.

Meanwhile, the reason for determining whether to correct measurement values based on the difference of the rates of change of the measurement values as above is that, if external electronic apparatuses exist in the same space, the rates of change of measurement values will be identical or similar while external electronic apparatuses related to the measurement values operate, and thus it may be determined whether the external electronic apparatuses exist in the same space through the difference of the rates of change of the measurement values. Also, the reason that it should be determined whether external electronic apparatuses exist in the same space is that, in the case of external electronic apparatuses existing in different spaces, it would be natural that there is a difference in measurement values, and thus it would be desirable to correct measurement values in case external electronic apparatuses existing in the same space (or in a close distance) display different measurement values.

Accordingly, unlike in the above example, for instance, if a predetermined range for the rates of change is set as a range of two degrees, and the temperature measurement values displayed on the external electronic apparatuses 1, 2, 3 (10, 20, 30) became 23 degrees, 18 degrees, and 17 degrees after a specific time period passed after the stand type air conditioner operated, the rates of change of the measurement values becomes −1 degree for the external electronic apparatus 1 (10), −4 degrees for the external electronic apparatus 2 (20), and −5 degrees for the external electronic apparatus 3 (30). Accordingly, the difference of the rates of change between the external electronic apparatuses 2 and 3 (20, 30) belongs to the predetermined range, but in the case of the external electronic 1 (10), the difference exceeds the predetermined range when its rate of change is compared with any one of the external electronic apparatuses 2 and 3 (20, 30).

In this case, the processor 120 may identify the external electronic apparatuses 2 and 3 (20, 30) as external electronic apparatuses of which differences of the rates of change belong to the predetermined range, and correct the measurement values such that the measurement values received from the external electronic apparatuses 2 and 3 (20, 30) become identical.

That is, in this case, there is a high possibility that the external electronic apparatus 1 (10) exists in a different space from the external electronic apparatuses 2 and 3 (20, 30), or even if it exists in the same space, it is under a special circumstance (e.g., arranged beside a window in midsummer). Thus, the processor 120 may not correct the measurement value of the external electronic apparatus 1 (10).

In the above, an example wherein measurement values are temperatures, and the difference of the rates of change of the measurement values is 2 degrees was suggested, but the disclosure is obviously not limited thereto. For example, with respect to measurement values for dust concentration, the server 100-1 may receive measurement values from each external electronic apparatus 10, 20, 30 while the air purifier (the external electronic apparatus 3 (30)) operates, identify at least one external electronic apparatus wherein there is no difference in the rate of change of the measurement value (i.e., wherein the rate of change of the measurement value is identical), and correct the measurement value of the external electronic apparatus.

Meanwhile, in the above, a case wherein the electronic apparatus 100 is the server 100-1 was suggested as an example, but the embodiments of the disclosure are not limited thereto, and any one of the aforementioned external electronic apparatuses 10, 20, 30 may replace the role of the aforementioned server 100-1.

That is, according to an embodiment of the disclosure, any one of the aforementioned external electronic apparatuses 10, 20, 30 may become the electronic apparatus 100 in FIG. 2. In this case, the electronic apparatus 100 may further include various kinds of components for performing the functions of the electronic apparatus in addition to the communicator 110 and the processor 120 in FIG. 2.

Figure 4A:
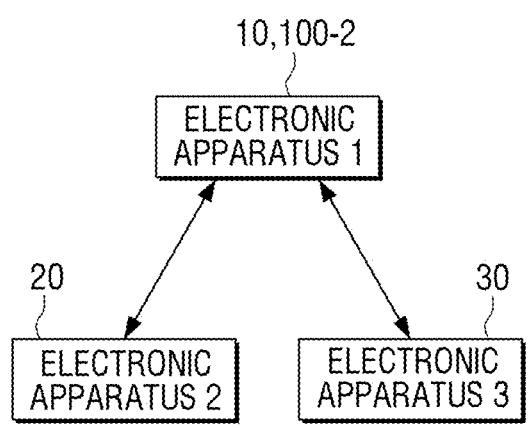
FIG. 4A is a diagram illustrating an example wherein the electronic apparatus in FIG. 2 is implemented as one of external electronic apparatuses according to another embodiment of the disclosure.

For example, as illustrated in FIG. 4A, the electronic apparatus 1 (10, 100-2) which is an air quality measuring apparatus may replace the operation of the aforementioned server 100-1. In this case, the electronic apparatus 1 (10, 100-2) may further include a temperature sensor, a humidity sensor, a fine dust sensor, and a display for displaying measurement values in addition to the communicator 110 and the processor 120 illustrated in FIG. 2.

Meanwhile, in this case, the electronic apparatuses 2 and 3 (20, 30) become external electronic apparatuses, and the electronic apparatuses 2 and 3 (20, 30) transmit measurement values for the displayed state of air to the electronic apparatus 1 (10, 100-2). Accordingly, the electronic apparatus 1 (10, 100-2) may perform the operation of the processor 120 of the aforementioned server 100-1 based on the measurement values received from the external electronic apparatuses 2 and 3 (20, 30) and the measurement value that it measured and displays. Hereinafter, overlapping explanation will be omitted.

As described above, according to an embodiment of the disclosure, through Device to Device (D2D) communication among the electronic apparatuses 10, 20, 30 that can directly control or measure the state of air without a server 100-1, correction of measurement values for the state of air may be performed in a similar manner to what was explained through FIG. 3.

Figure 4B:
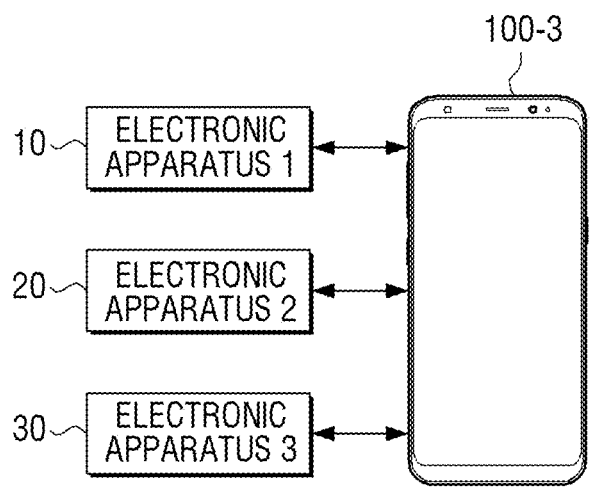
FIG. 4B is a diagram illustrating an example wherein the electronic apparatus in FIG. 2 is implemented as a mobile device according to still another embodiment of the disclosure.

FIG. 4B illustrates an example wherein the electronic apparatus 100 in FIG. 2 is implemented as a mobile device 100-3 according to another embodiment of the disclosure. That is, according to FIG. 4B, the mobile device 100-3 such as a smartphone, a tablet, and a PDA may replace the role of the aforementioned server 100-1 through FIG. 3. In this case, the electronic apparatus 100 may further include various kinds of components for performing the functions of the mobile device in addition to the communicator 110 and the processor 120 in FIG. 2.

According to FIG. 4B, the plurality of external electronic apparatuses 10, 20, 30 transmit the measurement values for the state of air displayed on each apparatus to the mobile device 100-3, and the mobile device 100-3 may perform the operation of the processor 120 of the aforementioned server 100-1 based on the received measurement values. Hereinafter, overlapping explanation will be omitted.

Figure 5A:
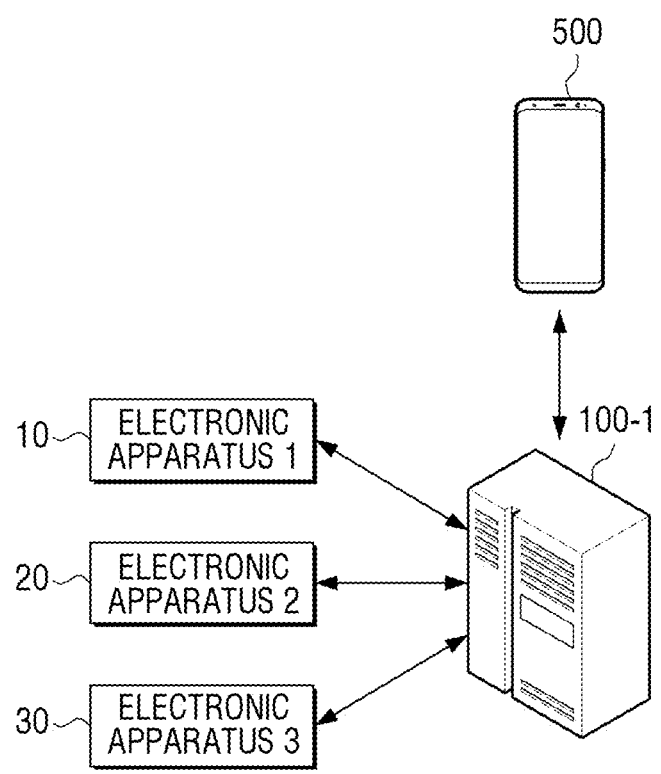
FIG. 5A is a diagram illustrating a measurement value correction system according to an embodiment of the disclosure.

Meanwhile, according to still another embodiment of the disclosure, the plurality of external electronic apparatuses 10, 20, 30 may be integrally managed through a mobile device. FIG. 5A is a diagram illustrating a measurement value correction system according to an embodiment of the disclosure.

According to FIG. 5A, a measurement value correction system may include a plurality of external electronic apparatuses 10, 20, 30, a server 100-1, and a mobile device 500.

In the mobile device 500, an application that can integrally manage electronic apparatuses that can directly control or measure the state of air may be installed. Accordingly, a user may manage electronic apparatuses that can directly control or measure the state of air by dividing them for each living space of the user through the above installed application.

For example, a user may set an air quality measuring apparatus, a stand type air conditioner, and an air purifier as electronic apparatuses located in "the living room" which is the same space through an application installed in the mobile device 500.

Figure 5B:
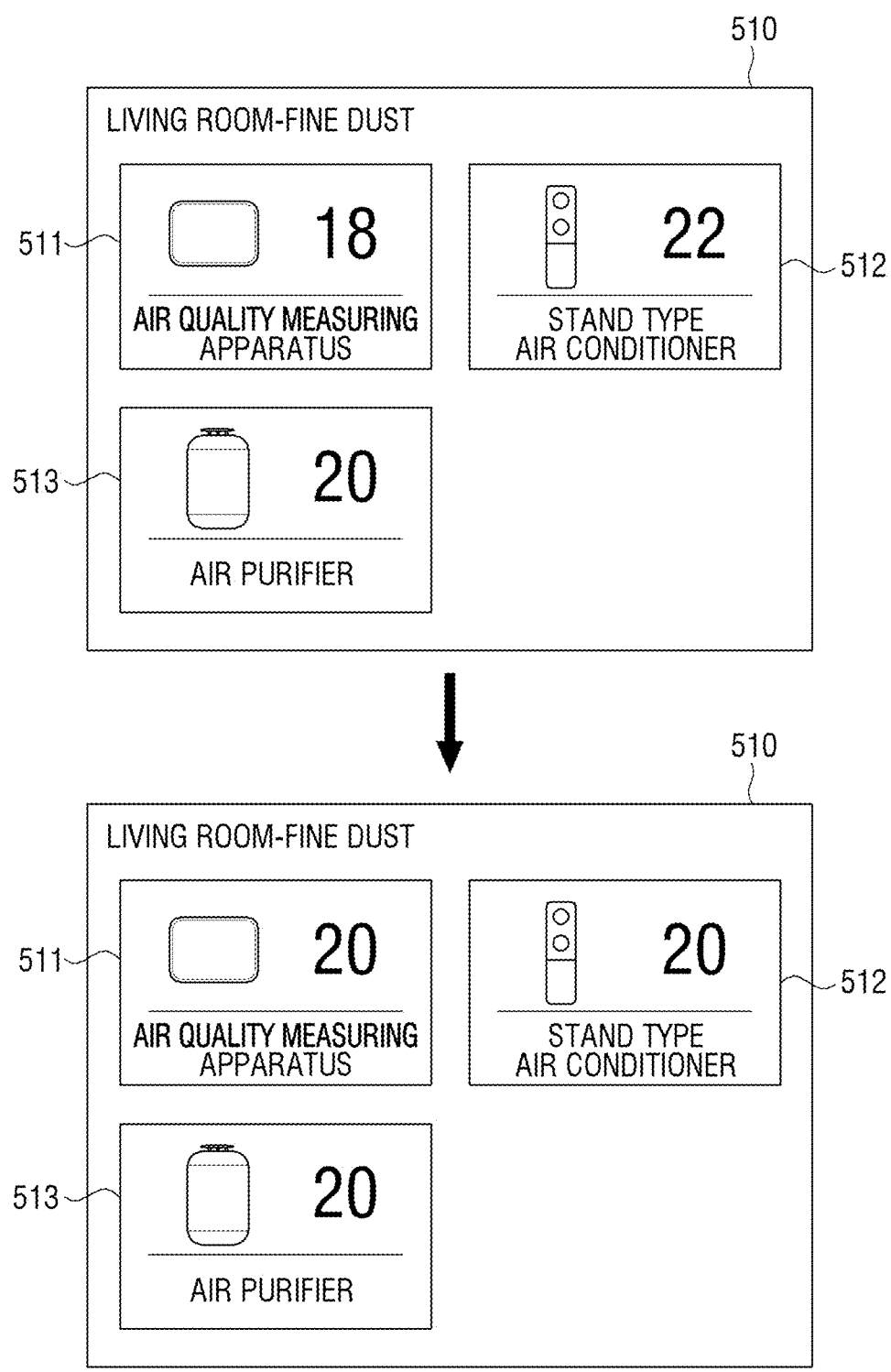
FIG. 5B is a diagram illustrating an example of a UI displayed on the mobile device in FIG. 5A.

FIG. 5B illustrates an execution screen 510 of the application installed in the mobile device 500 in FIG. 5A. As illustrated in the above drawing in FIG. 5B, it can be seen that the air quality measuring apparatus 511, the stand type air conditioner 512, and the air purifier 513 are set to be located in the living room according to setting of a user.

As described above, if a user sets electronic apparatuses located in the same space, the mobile device 500 may transmit information on the electronic apparatuses set as being located in the same space to the server 100-1.

Accordingly, the processor 120 of the server 100-1 may receive measurement values for the state of air from the electronic apparatuses set as being located in the same space, and transmit information related to the corrected measurement values acquired through the process as described above through FIG. 3 to the mobile device 500.

Accordingly, the mobile device 500 may display the measurement values of the electronic apparatuses set as being located in the same space through the application to be the same, based on the information related to the corrected measurement values received from the server 100-1.

Referring to FIG. 5B, it can be seen that the measurement values regarding concentration of fine dust that were displayed as different values in the above drawing are displayed to be the same as 20 as can be seen in the drawing below.

Meanwhile, in the embodiments as in FIG. 5A and FIG. 5B, the processor 120 of the server 100-1 may identify external electronic apparatuses of which differences of the rates of change of the measurement values do not belong to a predetermined range among the plurality of external electronic apparatuses, and control the communicator 110 to transmit a command for releasing setting of the same space for the external electronic apparatuses identified to not belong to the predetermined range to the mobile device 500.

Accordingly, the mobile device 500 may release the setting of the user for the electronic apparatuses of which differences in the rates of change are identified to not belong to the predetermined range among the plurality of electronic apparatuses set by the user to exist in the same space.

That is, even in the case of an electronic apparatus initially located in the same space as other electronic apparatuses, the electronic apparatus may be located in another space without any limitation by a user's moving of the electronic apparatus or changing of the location of installation later. Accordingly, in the case of an electronic apparatus of which difference of the rate of change of the measurement value does not belong to a predetermined range, it is difficult to regard the electronic apparatus as existing in the same space. Thus, it is desirable that a user's setting of the electronic apparatus as existing in the same space is released.

Here, the mobile device 500 may provide a notification regarding releasing of the setting to the user, and release the setting for the electronic apparatus according to a user command accepting this. Also, the mobile device 500 may release the setting of the same space automatically according to receipt of a command for release.

In the above, a case wherein the mobile device 500 manages the plurality of external electronic apparatuses 10, 20, 30 through the server 100-1 was suggested as an example, but the embodiments of the disclosure are not limited thereto. In a case wherein the mobile device 100-3 replaces the role of the server 100-1 without the server 100-1 as in FIG. 4B, operations as in FIG. 5A and FIG. 5B will be possible.

Figure 6:
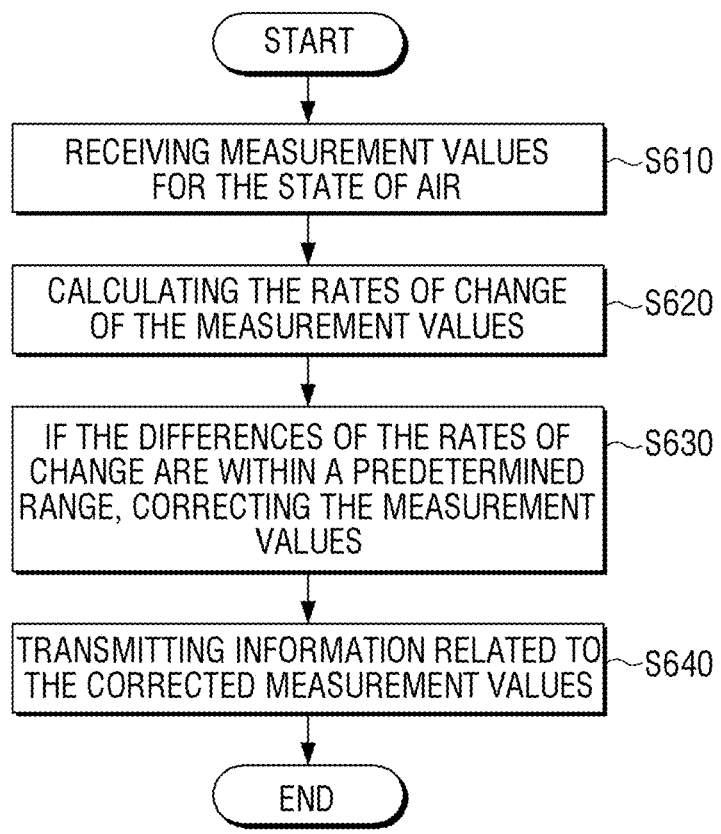
FIG. 6 illustrates a flow chart of a controlling method of an electronic apparatus according to an embodiment of the disclosure.

FIG. 6 illustrates a flow chart of a controlling method of the electronic apparatus 100 according to an embodiment of the disclosure. According to FIG. 6, the electronic apparatus 100 may receive measurement values for the state of air displayed on a plurality of external electronic apparatuses from each external electronic apparatus at operation S610, and calculate the rates of change of the measurement values for each of the plurality of external electronic apparatuses based on the received measurement values at operation S620. Here, the state of air displayed on the plurality of external electronic apparatuses may be any one of the temperature, humidity, or concentration of dust, and the plurality of external electronic apparatuses may be electronic apparatuses equipped with a function of directly controlling or measuring the state of air.

Meanwhile, the electronic apparatus 100 may identify external electronic apparatuses of which differences of the calculated rates of change belong to a predetermined range among the plurality of external electronic apparatuses, and correct the measurement values received from at least one external electronic apparatus among the identified external electronic apparatuses such that the measurement values received from the identified external electronic apparatuses become the same as one another at operation S630. Here, the electronic apparatus 100 may correct the received measurement values based on any one of the average value, the minimum value, the maximum value, or the median value of the plurality of measurement values received from the plurality of external electronic apparatuses.

The electronic apparatus 100 may transmit information related to the corrected measurement values to at least one external electronic apparatus of which measurement values were corrected at operation S640. Here, information related to the corrected measurement values may be any one of correction values which are corrected from the measurement values received from the at least one external electronic apparatus or a correction formula for correcting the measurement values received from the at least one external electronic apparatus.

Accordingly, the measurement values displayed on the at least one external electronic apparatus may be corrected based on the information related to the corrected measurement values received from the electronic apparatus 100.

Figure 7:
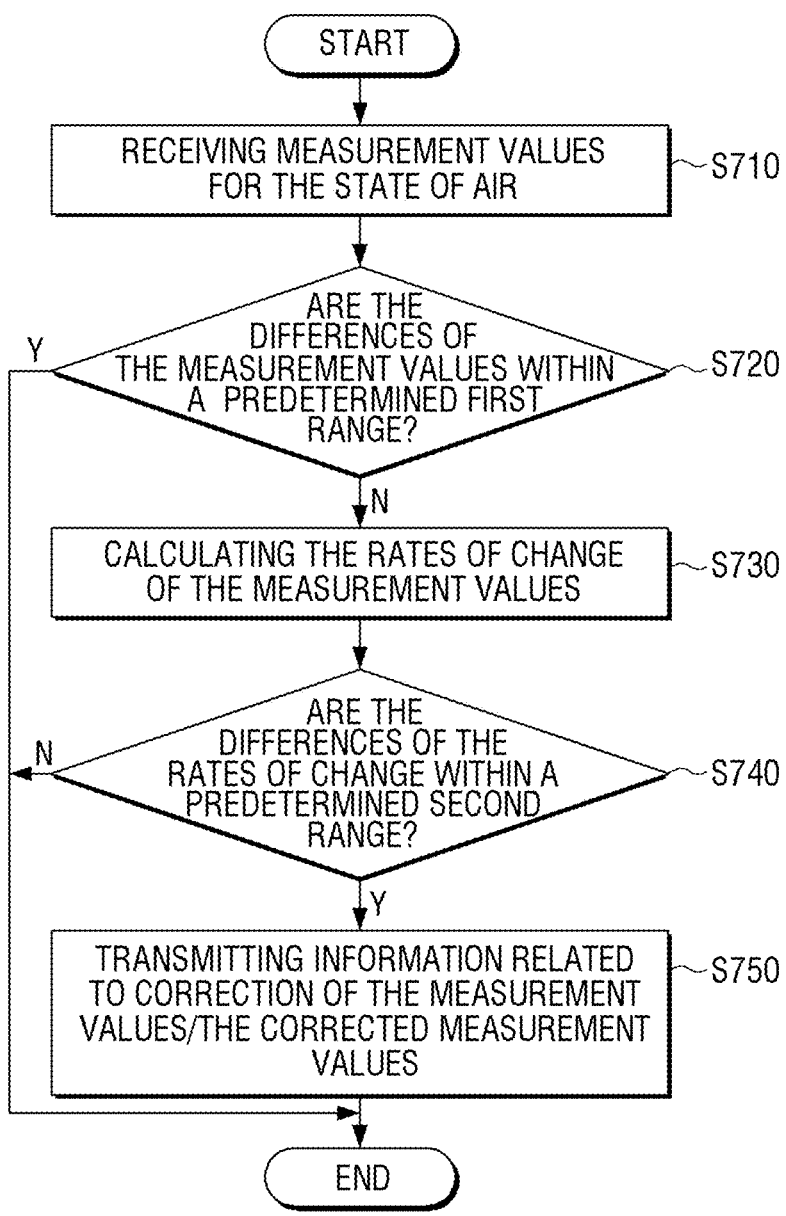
FIG. 7 illustrates a flow chart of a controlling method of an electronic apparatus according to another embodiment of the disclosure.

FIG. 7 illustrates a flow chart of a controlling method of an electronic apparatus according to another embodiment of the disclosure. According to FIG. 7, when measurement values for the state of air displayed on a plurality of external electronic apparatuses are received from each external electronic apparatus at operation S710, the electronic apparatus 100 may determine whether the difference of the received measurement values belongs to a predetermined first range at operation S720.

If the difference of the received measurement values does not belong to the predetermined first range at operation S720, N, the electronic apparatus 100 calculates the rates of change of the received measurement values for each external electronic apparatus at operation S730. Here, the electronic apparatus 100 may calculate the rates of change based on the plurality of measurement values received from each of the plurality of external electronic apparatuses while external electronic apparatuses that can control the state of air related to the measurement values operate among the plurality of external electronic apparatuses.

Accordingly, in case the difference of the calculated rates of change belongs to a predetermined second range at operation S740, Y, the electronic apparatus 100 may identify external electronic apparatuses of which differences of the calculated rates of change belong to the predetermined range among the plurality of external electronic apparatuses, correct the measurement values received from at least one external electronic apparatus among the identified external electronic apparatuses such that the measurement values received from the identified external electronic apparatuses become the same as one another, and transmit information related to the corrected measurement values to the at least one external electronic apparatus at operation S750.

Meanwhile, if the difference of the measurement values received from each of the plurality of external electronic apparatuses is within the predetermined first range at operation S720, Y, there is no difference among the measurement values or there is only a slight difference, and thus the measurement values of the external electronic apparatuses are not corrected.

Also, even in the case of calculating the rates of change, in the case of an external electronic apparatus of which difference of the rate of change of the calculated measurement value does not belong to the predetermined second range, the external electronic apparatus exists in a different space from the remaining external electronic apparatuses, and thus the measurement value of the external electronic apparatus is not corrected.

Meanwhile, according to another embodiment of the disclosure, a plurality of external electronic apparatuses may be set as electronic apparatuses located in the same space based on a user command input through an application installed in a mobile device.

Here, the electronic apparatus 100 may transmit information related to the corrected measurement values to the mobile device such that the measurement values of the at least one electronic apparatus corrected to the same value are displayed through the application.

Also, the electronic apparatus 100 may identify external electronic apparatuses of which differences of the rates of change do not belong to the predetermined second range among the plurality of external electronic apparatuses, and transmit a command for releasing the setting of a user for the external electronic apparatuses identified to not belong to the predetermined second range to the mobile device.

Figure 8:
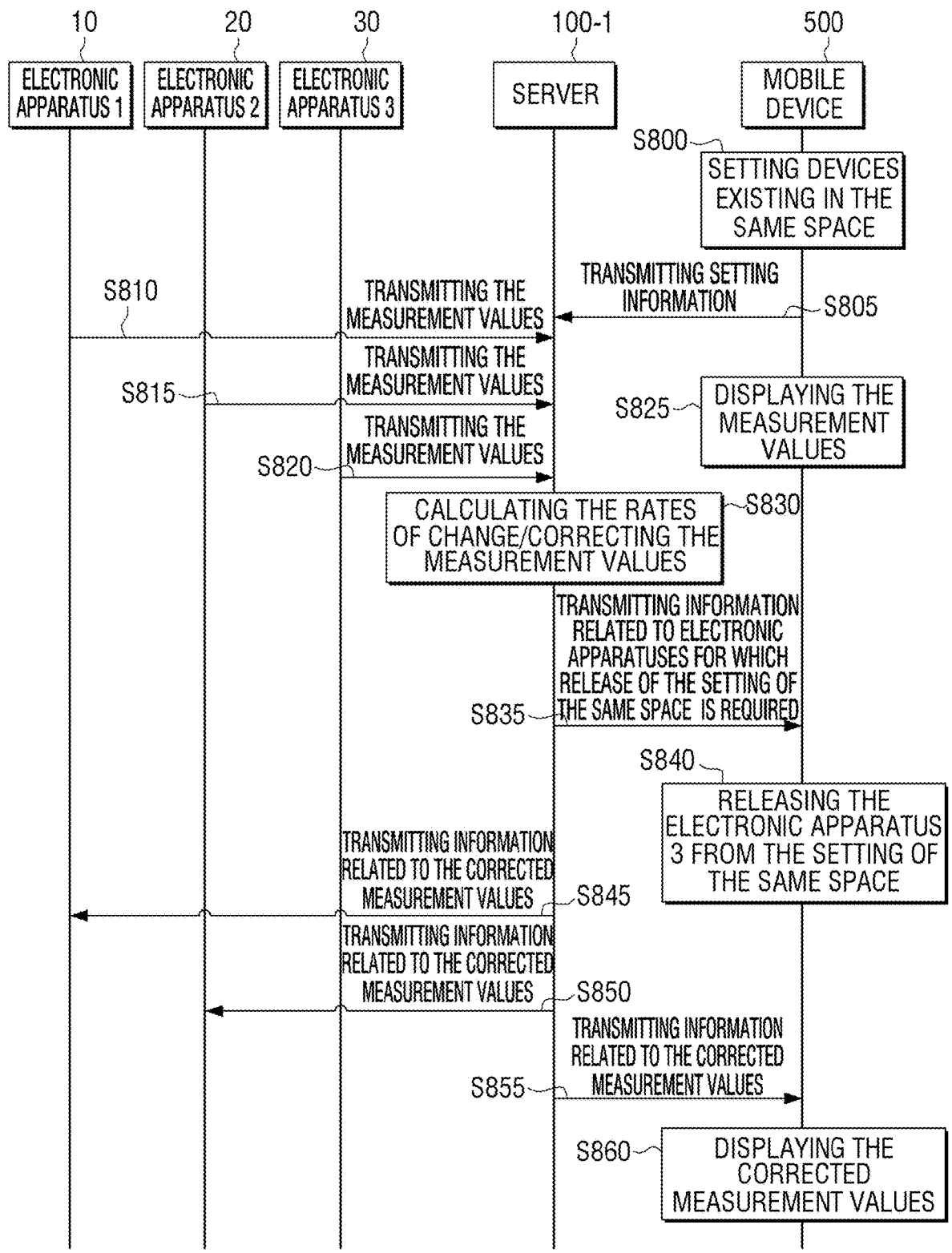
FIG. 8 illustrates a procedural diagram of a measurement value correction system according to an embodiment of the disclosure.

FIG. 8 illustrates a procedural diagram of a measurement value correction system according to an embodiment of the disclosure. The measurement value correction system in FIG. 8 includes components as in FIG. 5A.

According to FIG. 8, the mobile device 500 may set the electronic apparatus 1 (10), the electronic apparatus 2 (20), and the electronic apparatus 3 (30) as electronic apparatuses located in the same space based on a user command input through an installed application at operation S800. Accordingly, the mobile device 500 may transmit information on the setting set through the application to the server 100-1 at operation S805.

Accordingly, when the electronic apparatus 1 (10), the electronic apparatus 2 (20), and the electronic apparatus 3 (30) respectively transmit the measurement values for the state of air displayed on the electronic apparatus 1 (10), the electronic apparatus 2 (20), and the electronic apparatus 3 (30) at operations S810, S815, and S820, the server 100-1 receives the measurement values.

Meanwhile, the mobile device 500 may receive the measurement values transmitted from the electronic apparatus 1 (10), the electronic apparatus 2 (20), and the electronic apparatus 3 (30) from the server 100-1, and display them through the application at operation S825.

Meanwhile, the server 100-1 calculates the rates of change for the measurement values of each electronic apparatus based on the received measurement values, and corrects the measurement values of at least one electronic apparatus as described above according to the differences of the calculated rates of change at operation S830.

Here, the server 100-1 may identify electronic apparatuses which require release of setting of the same space among the electronic apparatus 1 (10), the electronic apparatus 2 (20), and the electronic apparatus 3 (30), and transmit a command for releasing the setting of the same space including information related to the electronic apparatuses to the mobile device 500 at operation S835.

FIG. 8 illustrates a case wherein the differences of the rates of change of the measurement values of the electronic apparatus 1 (10) and the electronic apparatus 2 (20) belong to a predetermined range, and the difference of the rate of change of the measurement value of the electronic apparatus 3 (30) does not belong to a predetermined range, and thus release of setting of the same space is required as an example. Thus, the server 100-1 may transmit a command for releasing the setting of the same space for the electronic apparatus 3 (30) to the mobile device 500, and accordingly, the mobile device 500 may release the electronic apparatus 3 (30) from the setting of the same space at operation S840.

Meanwhile, the server 100-1 may respectively transmit information related to the corrected measurement values regarding the electronic apparatus 1 (10) and the electronic apparatus 2 (20) at operations S845 and S850, and accordingly, the electronic apparatus 1 (10) and the electronic apparatus 2 (20) may respectively display corrected measurement values based on the information related to the corrected measurement values.

Here, the server 100-1 may also transmit information related to the corrected measurement values regarding the electronic apparatus 1 (10) and the electronic apparatus 2 (20) to the mobile device 500 at operation S855, and the mobile device 500 may display the corrected measurement values regarding the electronic apparatus 1 (10) and the electronic apparatus 2 (20) based on the received information through the application at operation S860.

According to the various embodiments of the disclosure as described above, confusion of a user that occurs as measurement values of the same kind displayed by electronic apparatuses existing within a close distance are different from one another can be prevented.

Meanwhile, the various embodiments of the disclosure may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus 100 according to the aforementioned embodiments.

In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' means that a storage medium does not include signals, and is tangible, but does not indicate whether data is stored in the storage medium semi-permanently or temporarily.

Also, according to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of controlling an electronic apparatus, the method comprising:
   receiving, from a mobile device, a command setting a plurality of external electronic apparatuses as electronic apparatuses located in a same space;
   based on the setting as electronic apparatuses located in the same space, receiving, from each of the plurality of external electronic apparatuses, an electronic signal including measurement values for a state of air measured by respective sensors in each of the plurality of external electronic apparatuses;
   determining rates of change of the measurement values for each of the plurality of external electronic apparatuses based on the measurement values;
   identifying, based on the rates of changes, electronic apparatuses among the plurality of external electronic apparatuses of which a difference in the determined rates of changes between the external electronic apparatuses do not belong to a predetermined range; and
   transmitting, to the mobile device, a command releasing the external electronic apparatuses identified to not belong to the predetermined range from the setting as electronic apparatuses located in the same space.

2. The method of claim 1, wherein the determining the rates of change comprises determining the rates of change based on a plurality of measurement values received from each of the plurality of external electronic apparatuses while external electronic apparatuses that can control the state of air among the plurality of external electronic apparatuses operate.

3. The method of claim 1 further comprising:
   Generating a corrected measurement value based on any one of an average value, a minimum value, a maximum value, or a median value of the measurement values received from the plurality of external electronic apparatuses, and
   transmitting, to at least one external electronic apparatus, information related to the corrected measurement value.

4. The method of claim 3, further comprising transmitting information related to the corrected measurement value to the mobile device such that the corrected measurement value is displayed through an application installed on the mobile device.

5. The method of claim 1, wherein the state of air is any one of a temperature, a humidity, or a concentration of dust.

6. An electronic apparatus comprising:
   a communicator; and
   a processor configured to:
      receive, from a mobile device, a command setting a plurality of external electronic apparatuses as electronic apparatuses located in a same space;
      based on the setting as electronic apparatuses located in the same space, receive, from each of the plurality of external electronic apparatuses, an electronic signal including measurement values for a state of air measured by respective sensors in each of the plurality of external electronic apparatuses through the communicator;
      determine rates of change of the measurement values for each of the plurality of external electronic apparatuses based on the measurement values;
      identify, based on the rates of change, external electronic apparatuses among the plurality of external electronic apparatuses of which a difference in the determined rates of change between the external electronic apparatuses do not belong to a predetermined range; and
      transmit, to the mobile device, a command releasing the external electronic apparatuses identified to not belong to the predetermined range from the setting as electronic apparatuses located in the same space.

7. The electronic apparatus of claim 6, wherein the processor is further configured to determine the rates of change based on a plurality of measurement values received from each of the plurality of external electronic apparatuses while external electronic apparatuses that can control the state of air among the plurality of external electronic apparatuses operate.

8. The electronic apparatus of claim 6, wherein the processor is further configured to generate a corrected measurement value based on any one of an average value, a minimum value, a maximum value, or a median value of the measurement values received from the plurality of external electronic apparatuses, and
   transmit, to at least one external electronic apparatus, information related to the corrected measurement value.

9. The electronic apparatus of claim 8, wherein the processor is further configured to transmit information related to the corrected measurement value to the mobile device such that the corrected measurement value is displayed through an application installed on the mobile device.

10. The electronic apparatus of claim 6, wherein the state of air is any one of a temperature, a humidity, or a concentration of dust.

11. A non-transitory computer-readable recording medium including a program for executing a controlling method of an electronic apparatus, wherein the controlling method comprises:
    receiving, from a mobile device, a command setting a plurality of external electronic apparatuses as electronic apparatuses located in a same space;
    based on the setting as electronic apparatuses located in the same space, receiving, from each of the plurality of external electronic apparatuses, an electronic signal including measurement values for a state of air measured by respective sensors in each of the plurality of external electronic apparatuses;
    determining rates of change of the measurement values for each of the plurality of external electronic apparatuses based on the measurement values;
    comparing the determined rates of change of the measurement values for each of the plurality of external electronic apparatuses;
    identifying, based on the rates of changes, external electronic apparatuses among the plurality of external electronic apparatuses of which a difference in the determined rates of change between the external electronic apparatuses do not belong to a predetermined range; and transmitting, to the mobile device, a command releasing the external electronic apparatuses identified to not belong to the predetermined range from the setting as electronic apparatuses located in the same space.

12. The non-transitory computer-readable recording medium of claim 11, wherein the determining the rates of change by the electronic apparatus being executed by the controlling method comprises determining the rates of change based on a plurality of measurement values received from each of the plurality of external electronic apparatuses while external electronic apparatuses that can control the state of air among the plurality of external electronic apparatuses operate.

* * * * *